United States Patent
Le Ravalec-Dupin et al.

(10) Patent No.: US 7,657,413 B2
(45) Date of Patent: Feb. 2, 2010

(54) METHOD OF CONSTRAINING A HETEROGENEOUS PERMEABILITY FIELD REPRESENTING AN UNDERGROUND RESERVOIR BY DYNAMIC DATA

(75) Inventors: Mickaële Le Ravalec-Dupin, Rueil Malmaison (FR); Darryl Fenwick, Paris (FR)

(73) Assignee: Institut Francais du Petrole, Rueil Malmalson Cedex (FR)

( * ) Notice: Subject to any disclaimer, the term of this patent is extended or adjusted under 35 U.S.C. 154(b) by 549 days.

(21) Appl. No.: 10/615,772

(22) Filed: Jul. 10, 2003

(65) Prior Publication Data
US 2005/0010383 A1 Jan. 13, 2005

(30) Foreign Application Priority Data
Jul. 11, 2002 (FR) .................................. 02 08714

(51) Int. Cl.
G06G 7/48 (2006.01)
G06G 7/50 (2006.01)
G01V 1/40 (2006.01)
G01V 3/18 (2006.01)
G01V 5/04 (2006.01)
G01V 9/00 (2006.01)

(52) U.S. Cl. .................... 703/10; 703/9; 702/6; 702/12
(58) Field of Classification Search ................... 703/10, 703/5, 9; 702/14, 6, 12
See application file for complete search history.

(56) References Cited

U.S. PATENT DOCUMENTS 6,064,944 A * 5/2000 Sarda et al. .................... 702/11
6,305,216 B1 * 10/2001 Samaroo .................... 73/53.01
6,480,790 B1 * 11/2002 Calvert et al. ................. 702/14
6,549,879 B1 * 4/2003 Cullick et al. ................. 703/10
6,618,695 B1 * 9/2003 Hu et al. ........................ 703/2

(Continued)

FOREIGN PATENT DOCUMENTS

FR 2795841 2/1999

OTHER PUBLICATIONS

Hu, Lin Y. "Gradual Deformation and Iterative Calibration of Gaussian-Related Stochastic Models." Mathematical Geology, vol. 32, No. 1. 2000.*

(Continued)

Primary Examiner—Kamini S Shah
Assistant Examiner—David Silver
(74) Attorney, Agent, or Firm—Antonelli, Terry, Stout & Kraus, LLP.

(57) ABSTRACT

A method of constraining a stochastic model of Gaussian or related type, representing a porous medium such as an underground reservoir, to data characteristic of the displacement of the fluids is disclosed. The method is based on an iterative development in two stages. The first stage carries out a flow simulation, in identifying zones inside the reservoir and in estimating the modification to be brought to the effective permeabilities of these zones so as to improve calibration between the real data and the corresponding responses obtained with the flow simulator. The second stage involves an intermediate optimization problem intended to minimize an intermediate objective function (implemented from a gradual deformation technique) measuring the difference between the effective permeabilities calculated for the zones and the effective permeabilities identified during the first stage for better calibration.

16 Claims, 1 Drawing Sheet

U.S. PATENT DOCUMENTS

| | | | |
|---|---|---|---|
| 6,813,565 B1* | 11/2004 | Hu et al. | 702/14 |
| 6,826,520 B1* | 11/2004 | Khan et al. | 703/10 |
| 6,980,940 B1* | 12/2005 | Gurpinar et al. | 703/10 |
| 7,006,959 B1* | 2/2006 | Huh et al. | 703/10 |
| 7,031,891 B2* | 4/2006 | Malthe-Sorenssen et al. | 703/2 |
| 7,324,929 B2* | 1/2008 | Huh et al. | 703/10 |
| 2002/0010570 A1* | 1/2002 | Malthe-Sorenssen et al. | 703/10 |
| 2002/0013687 A1* | 1/2002 | Ortoleva | 703/10 |
| 2002/0029882 A1* | 3/2002 | Rouffignac et al. | 166/244.1 |
| 2003/0028325 A1* | 2/2003 | Roggero et al. | 702/11 |
| 2004/0015295 A1* | 1/2004 | Bratvedt et al. | 702/13 |
| 2006/0020438 A1* | 1/2006 | Huh et al. | 703/10 |
| 2006/0277013 A1* | 12/2006 | Bennis et al. | 703/10 |
| 2007/0005253 A1* | 1/2007 | Fornel et al. | 702/14 |
| 2007/0179766 A1* | 8/2007 | Cullick et al. | 703/10 |
| 2007/0179767 A1* | 8/2007 | Cullick et al. | 703/10 |
| 2009/0138213 A1* | 5/2009 | Watts et al. | 702/45 |

OTHER PUBLICATIONS

Roggero, F. et al. "Gradual Deformation of Continuous Geostatistical Models for History Matching." 1998 SPE Annual Technical Conference and Exhibition.*

Le Ravalec, Mickaele, et al. "The FFT Moving Average (FFT-MA) Generator: An Efficient Numerical Method for Generating and Conditioning Gaussian Simulations." Mathematical Geology vol. 32 No. 6. 2000.*

Hu, L.Y. et al. "Reducing Uncertainties in Production Forecasts by Constraiing Geological Modeling to Dynamic Data." 1999 SPE Annual Technical Conference and Exhibition.*

Le Ravalec-Dupin, Mickaele and Benoit Noetinger. "Optimization with the Gradual Deformation Method." Mathematical Geology, vol. 34 No. 2 Feb. 2002.*

Jang, Minchul and Jonggeun Choe. "Stochastic Optimization for Global Minimization and Geostatistical Calibration." Journal of Hydrology 266 (2002).*

Gautier, Yann, and Benoit Noetinger. "Preferential Flow-Paths Detection for Heterogeneous Reservoirs Using a New Renomalization Technique." Transport in Porous Media 26, 1997.*

Deutsch, et al., Geostatistical Techniques Improve Reservoir Management, Reservoir Engineering, Petroleum Engineer International, Mar. 1996, pp. 21-27.

Tran, et al., Efficient Conditioning of 3D Fine-Scale Reservoir Model To Multiphase Production Data Using Streamline-Based Coarse-Scale Inversion and Geostatistical Downscaling, pp. 1-13.

Wang, et al., A Streamline Approach For History-Matching Production Data, pp. 1-14.

Le Gallo, et al., History Matching Geostatistical Reservoir Models with Gradual Deformation Method, pp. 1-13.

* cited by examiner

METHOD OF CONSTRAINING A HETEROGENEOUS PERMEABILITY FIELD REPRESENTING AN UNDERGROUND RESERVOIR BY DYNAMIC DATA

BACKGROUND OF THE INVENTION

1. Field of the Invention

The present invention relates to a method of constraining stochastic models representing heterogeneous underground zones such as oil reservoirs to data referred to as dynamic because they vary with the fluid displacements. These data are, for example, production data or pressure data obtained from well tests.

2. Description of the Prior Art

The use of stochastic models of Gaussian type for representing the heterogeneity of underground structures is for example described by:

Journel, A. G. and Huijbregts, Ch. J.: "Mining Geostatistics", Academic Press, 1978, or Chilés, J. P. and Delfiner, P.: "Geostatistics—Modeling Spatial Uncertainty", Wiley-Interscience Publishers, John Wiley & Sons, 1999.

A numerical reservoir model can be formed from a set of grid cells to which the values of a realization of a stochastic model of Gaussian or related type are assigned. These values can be assimilated to porosities or permeabilities.

Matching the numerical reservoir model with the dynamic data measured in the field can be done as an optimization problem. A previously defined objective or cost function quantifies the difference between the dynamic data measured for the real medium and the corresponding responses of the numerical reservoir model. These responses are calculated by means of a numerical flow simulator. The goal of the optimization problem is to modify the reservoir model or rather the associated realization to minimize the objective function. This process is iterative: each iteration implies direct simulation of the flows. A good optimization method should allow:
a) modifying realizations discretized on a very large number of grid cells; b) carrying out the modifications while respecting the stochastic model, that is the modified realization has to be coherent with the stochastic model; and c) limiting the number of direct flow simulations because they require a considerable calculating time.

Simulated annealing can be mentioned as an example of known optimization techniques. This approach is for example described by:

Gupta, A. D. et al.: "Detailed Characterization of Fractured Limestone Formation Using Stochastic Inverse Approaches", SPE Ninth Symposium, 1994.

This technique is based on realization values exchange between grid cells. Upon each exchange, the objective function has to be calculated and therefore a direct flow simulation has to be carried out. This process requires an excessive number of iterations. Furthermore, in order to preserve the agreement between the realization and the stochastic model, an additional term concerning the variogram is introduced in the objective function, which makes optimization more delicate.

Other optimization techniques, more commonly applied, are based on calculation of gradients. Several approaches based on gradients are presented by: Tarantola, A.: "Inverse Problem Theory—Methods for Data Fitting and Model Parameter Estimation", Elsevier Science Publishers, 1987.

They require calculating the gradients of the objective function with respect to the parameters of the problem which are the values of the realization at each grid cell. The realizations are then modified as a function of these gradients so that the objective function decreases. The problem related to conditioning of a reservoir model to production data is not linear: the minimization techniques using gradient calculation are used iteratively. After each modification of the realization, a direct flow simulation is carried out and the gradients are recalculated. Applied suddenly, the gradient methods lead to calibration of the dynamic data but they destroy the coherence between the stochastic model and the realization. Besides, the gradient methods do not allow consideration of a very large number of parameters. In order to overcome these limits, geostatistical parameterization techniques can be integrated thereto. The pilot point method can be mentioned at this stage, which is described by: de Marsily, G. et al.: "Interpretation of Interference Tests in a Well Field Using Geostatistical Techniques to Fit the Permeability Distribution in a Reservoir Model" in Verly, G. et al. (ed.), Geostatistics for Natural Resources characterization, Part 2, D. Reidel Pub. Co. 1984.

This method selects in the realization a certain number of points referred to as pilot points, in calculating the derivatives of the objective function with respect to the values at these points, in modifying the values of these points accordingly and in propagating the disturbance thus defined by means of a kriging technique. The pilot point method can induce deviant value variations of the pilot points.

Another geostatistical parameterization technique, which allows the above-mentioned difficulty to be overcome, is the method of gradual deformation of a stochastic model of a heterogeneous medium such as an underground zone. It is described and used by Hu, L.-Y. et al., in French patents 2,780,798 and 2,795,841 filed by the assignee.

The gradual deformation method allows gradual modification of a realization of a stochastic model of Gaussian or related type while respecting this model. The deformed realization still is a realization of the stochastic model. When the gradual deformation method is introduced in an optimization process, the procedure is as follows. The initial realization is combined with a fixed number of independent realizations related to the same stochastic model. These realizations are called complementary realizations. Combination is controlled by as many deformation parameters as there are complementary realizations. It produces a new realization. The derivatives of the objective function with respect to the deformation parameters are then calculated. The deformation parameters are modified so as to take into account the information from the derivatives. A first optimization in relation to the deformation parameters provides a realization verifying the stochastic model and reducing the objective function. In general, this optimization process has to be repeated several times with different complementary realizations so as to sufficiently reduce the objective function, which may require, in some cases, a prohibitive number of direct flow simulations.

The gradual deformation method allows, in some cases, modifying a realization locally. This possibility is justified when the gradual deformation is combined with the FFTMA geostatistical generator described by:

Le Ravalec, M. et al.: The FFT Moving Average (FFT-MA) Generator: An Efficient Numerical Method for Generating and Conditioning Gaussian Simulations, Math. Geol., 32(6), 2000.

This generator produces realizations for a stochastic model of Gaussian type specified beforehand by convoluting a Gaussian white noise with an operator depending on the covariance function. A local deformation can be carried out by applying the gradual deformation method to the Gaussian white noise underlying the realization.

The gradient techniques developed to date for calibration in relation to dynamic data are based on a direct link between the variations to which the realization representing the reservoir is subjected and the variation of the objective function. The optimization process involves modifying first the realization, then starting a flow simulation to apprehend the resulting variations for calibration.

A different approach valid in cases where the flows are modelled by streamlines, is proposed by:

Wang, Y. and Kovscek, A. R.: A Streamline Approach for History-Matching Production Data, SPE/DOE IOR, 2000.

SUMMARY OF THE INVENTION

The method according to the invention allows working out numerical models, representing heterogeneous underground media such as oil reservoirs or aquifers, in accordance with a set of dynamic data measured in production, injection or observation wells, and with a stochastic model characterizing the spatial distribution of the heterogeneities.

By inverting the procedure of conventional approaches, the inventors provide a methodology based on the successive application of two stages. The first stage focuses on calibration allowing evaluation of the modification to be applied to the effective permeabilities of the streamlines in order to improve calibration. The second stage relates to the transfer of the effective permeability variation of the streamlines to the realization. This process is continued until a satisfactory calibration is obtained. The main limit of this approach is that it does not preserve the coherence of the realization in relation to the stochastic model.

The method essentially comprises minimization of the objective function from an iterative process subdivided in two stages and by integration of the gradual deformation method in the second stage. The first stage identifies the disturbance to be applied to the effective permeabilities of predetermined zones so as to reduce the objective function. The second stage focuses on the minimization of the difference between the desired effective permeabilities and the corresponding effective permeabilities calculated for the realization considered, by modifying this realization by means of the gradual deformation method. This minimization stage is an intermediate optimization which requires no new flow simulation and allows deforming the realization while respecting the Gaussian stochastic model. If the objective function is not satisfactory at this stage, the process is resumed at the first stage.

The method according to the invention is a decoupled gradual optimization method. The term gradual applies insofar as deformation of the numerical model is carried out according to the fundamental principles of the gradual deformation method. The term decoupled means that the optimization is based on two stages, the first stage defining the correction to be brought to the effective permeabilities, the second stage propagating the correction independently to the numerical model. These two stages imply that the flow simulations are carried out only during the first stage in order to improve calibration of the effective permeabilities. The second stage does not require a flow simulation to estimate the way the numerical reservoir model should be deformed.

In other words, the method according to the invention allows forming iteratively a model representative of the permeability field of a heterogeneous medium, discretized by a grid, such as an underground zone, constrained by a priori geologic data and dynamic data collected in the medium by means of measurements and observations obtained beforehand. The method includes:

a first stage comprising:
a) generating an initial model of the permeability in accordance with a Gaussian or related stochastic model, coherent with the a priori geologic data, and carrying out, by means of a suitable simulator, a simulation of the fluid flows,
b) identifying zones inside the reservoir, calculating the effective permeabilities of these zones and, from the simulator results, estimating the corrections to be brought to these effective permeabilities to improve calibration in relation to the data, and a second stage comprising: c) propagating the corrections to the whole of the grid cells of the permeability field, by means of an iterative optimization process comprising minimizing a functional which quantifies the difference between the effective permeabilities required to obtain the calibration and the effective permeabilities calculated for the permeability field considered, using a technique of gradual deformation of realizations of the stochastic model.

The zones are defined either manually or automatically from the flow simulator.

According to an embodiment, simulation of the flows is carried out by means of a streamline simulator and the zones of the medium are identified by a set of grid cells traversed by one or more streamlines of fixed geometry.

According to another embodiment, the zones are identified as volume portions on the periphery of wells running through the medium, within the framework of well tests.

According to another embodiment, at least one gradual deformation parameter is assigned to each zone.

In relation to the prior art, the method according to the invention allows calibration of a realization of a stochastic model to dynamic data while keeping the coherence in relation to the stochastic model and by reducing significantly the number of direct flow simulations to be carried out. Unlike the approaches developed to date, a deformation of the realization does not systematically involve a new flow simulation. The method thus affords the possibility of better exploring the space of the realizations and of rapidly determining not only one constrained realization, but several ones. Furthermore, the method according to the invention allows deforming the realization from a large number of parameters, which accelerates the intermediate optimization. It also allows deformation of the realization by zones, and the latter zones can be the same as the zones predetermined for calculation of the effective permeabilities during the first stage.

BRIEF DESCRIPTION OF THE DRAWINGS

Other features and advantages of the method according to the invention will be clear from reading the description hereafter, given by way of non limitative application example, with reference to the accompanying drawings wherein.

DETAILED DESCRIPTION OF THE PREFERRED EMBODIMENTS

Figure 1:
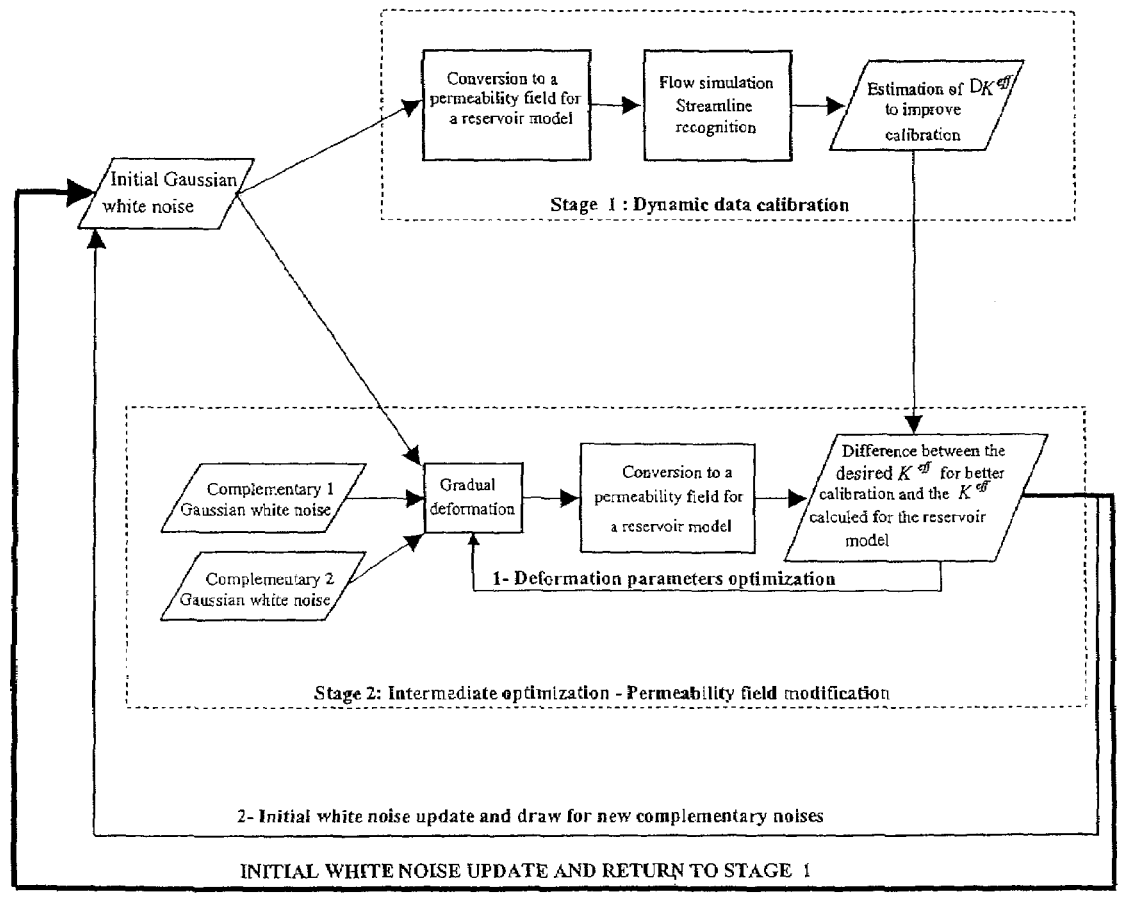
FIG. 1 shows an example of an optimization scheme in two stages according to the method of the invention.

Traditionally, calibration of reservoir models is an iterative process wherein a flow simulation is carried out each time the reservoir is disturbed. For simplicity's sake, the numerical reservoir model is considered to come down to a realization of a stochastic model for the permeability. In other words, a flow simulation is required for any variation of the permeability field. On the contrary, the method according to the invention can propose several permeability field variations using a single flow simulation. The method according to the invention therefore has two stages (FIG. 1). During the first stage, zones of the reservoir are determined and the correction to be brought to the effective permeabilities of these zones in order to improve data calibration is estimated. Then, an optimization process is started to propagate the disturbance determined for the effective permeabilities of these zones to the permeability field representing the reservoir. The first stage requires a flow simulation which depends on a comparison between real data and the corresponding synthetic responses. On the other hand, the second stage requires no additional flow simulation. Finally, the optimization performed in the second stage is parameterized according to the gradual deformation method, which allows preserving the coherence of the permeability values distribution (or any other property considered) in relation to the spatial variability model.

The general algorithm is summarized as follows:

An initial permeability field in accordance with a stochastic model being generated, a) stage 1—a flow simulation is performed, the effective permeabilities of these zones are calculated, zones are identified in the field which is considered and the variation to be applied to the effective permeabilities of these zones in order to reduce the difference between the production data measured in the field and the simulated production data is estimated;

b) stage 2—the disturbance required at the level of the effective permeabilities of the zones is propagated to the whole of the permeability field by means of an optimization process. The function to be minimized quantifies the difference between the desired effective permeabilities and the effective permeabilities calculated for the permeability field considered. The gradual deformation technique is used to modify the permeability field;

c) return to b) as long as the calibration is not satisfactory.

The effective permeabilities of the zones can be calculated using a simulator or the effective permeabilities can be obtained by means of averaging techniques well-known to in the art.

The method according to the invention is adaptable to any flow simulator insofar as means to define effective permeabilities for different zones of the reservoir are available, the latter being identified manually by the user or automatically from a given criterion. For example, for a well test simulator, rings of increasing radius, centered on the wells, can be selected to define the zones. The effective permeabilities can in this case be related to the apparent permeabilities.

In the example developed hereafter, the case of a streamline simulator is the focal point. The zones considered here are determined by the streamlines themselves. Each one of the aforementioned two stages is described in detail in the two sections hereunder.

Stage 1: Modification of the Effective Permeabilities

The objective of the first part is to describe the geometry of the streamlines and to identify the modification to be applied to the effective permeability of these lines so as to better calibrate the production data. A line or a set of streamlines define a zone.

Modelling flows by streamlines involves certain characteristics. The displacement of a fluid along a streamline is a one-dimensional problem; the streamlines do not communicate with one another. When the mobility ratio of the fluids is one and when the boundary conditions do not change, the geometry of the streamlines is fixed. When the mobility ratio is different from one, there are two alternatives: the geometry of the streamlines is fixed and the flow variations during the fluid displacement is allowed or the flow is uniformly distributed between the current streamlines and the geometry of the streamlines is periodically updated. The first configuration is chosen.

To simplify the problem, groups of streamlines are considered rather than the streamlines individually: Thus the number of parameters is reduced. The effective permeability of a group of streamlines is expressed as the harmonic mean weighted by the fluid volumes of the permeabilities of the grid cells traversed by the streamlines:

$$K_i^{eff} = \frac{\sum_{k=1}^{N_{gSL}} \sum_{j=1}^{N_k} q_{k,j} \Delta \tau_{k,j}}{\sum_{k=1}^{N_{gSL}} \sum_{j=1}^{N_k} \frac{q_{k,j} \Delta \tau_{k,j}}{k_j}} \qquad \text{Eq. 1}$$

$K_i^{eff}$ is the effective permeability of the i-th group of streamlines. $N_{gSL}$ is the number of streamlines contained in this i-th group; $N_k$ is the number of grid cells traversed by the k-th streamline of the i-th group; $q_{k,j}$ is the flow for the k-th streamline at the level of the j-th grid cell, $\Delta \tau_{k,j}$ is the flight time for the k-th streamline through the j-th grid cell.

Figure 2:
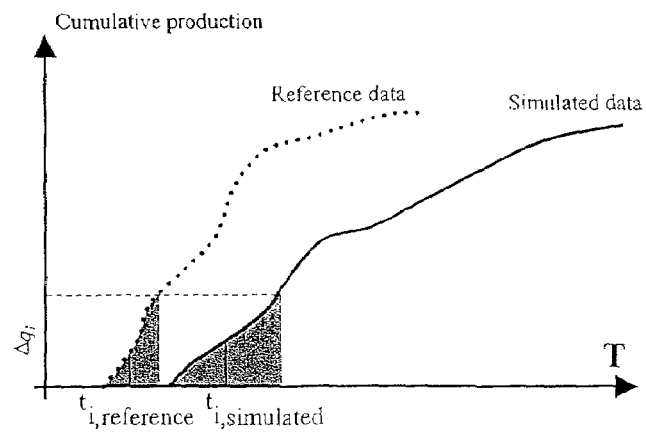
FIG. 2 shows a comparison between a real fractional flow and the corresponding simulated fractional flow.

For a given initial realization, the flow simulation allows determination of the geometry of the streamlines and calculation of their effective permeabilities. The effective permeability variation that would bring a production data calibration improvement remains to be evaluated. The fractional flows observed and the corresponding simulated fractional flows (FIG. 2) are therefore compared for the producing wells. The streamlines are then arranged in the increasing order of their breakthrough times and the fractional flow curves are discretized. The segments $\Delta q$ thus defined are associated with groups of streamlines. In the absence of accordance between the simulated flows and the real flows, the effective permeabilities of the groups of streamlines are considered to be responsible for the differences. A correction applied to all of the streamline groups allows this difference to be reduced. Consider the group of streamlines associated with a flow increment $\Delta q_i$ (FIG. 2). The effective permeability desired for streamline group i in order to improve calibration is:

$$K_{i,desired}^{eff} = \frac{t_{i,simulated}}{t_{i,reference}} K_{i,simulated}^{eff}$$

where $t_{i,reference}$ and $t_{i,simulated}$ are the mean breakthrough times associated with increment $\Delta q_i$ for the real and simulated fractional flow curves. The same procedure is carried out for each group of streamlines.

Stage 2: Intermediate Optimization—Modification of the Permeability Field

The first stage determines a variation to be applied to the effective permeabilities of the streamlines to calibrate the fractional flows. The goal of the second stage is to transfer this variation of the streamlines to the permeability field while preserving the coherence of the permeability field in relation to the stochastic model. An optimization problem is therefore defined. The function referred to as intermediate function is to be minimized here:

$$FI = \frac{1}{2}\sum_{i=1}^{N_g}\left(K_{i,desired}^{eff} - K_{i,simulated}^{eff}\right)^2$$

$N_g$ is the number of streamline groups.

$K_{i,desired}^{eff}$ is the desired effective permeability for the group i of streamlines in order to reduce the differences between the measured and simulated fractional flows: this value has been determined during the first stage.

$K_{i,simulated}^{eff}$ is the effective permeability of the group i of streamlines for the permeability field considered. This optimization problem is non-linear and can involve as many parameters as the permeability field contains grid cells. By integrating the deformation method as the parameterization technique, the number of parameters can be reduced and provide a permeability field modification that matches the stochastic model defining the spatial distribution of the heterogeneities in the permeability field. Furthermore, in order to be able to modify the permeability field by zones, the zones corresponding to the various streamline groups, the gradual deformation is not applied to the permeability field itself, but to the underlying Gaussian white noise (FIG. 1).

The simplest version of the gradual deformation method combines two Gaussian white noises, $z_1$ and $z_2$, according to the relation $$z(x)(\rho) = z_1(x)\cos(\pi\rho) + z_2(x)\sin(\pi\rho)$$

where $\rho$ is the deformation parameter and x the position. The gradient of z with respect to $\rho$ is:

$$\frac{\partial z}{\partial \rho} = -\pi z_1 \sin(\pi\rho) + \pi z_2 \cos(\pi\rho).$$

The Gaussian white noise z is then converted to a Gaussian realization y of covariance model C, average zero and variance one, by means of a convolution product developed at the heart of the FFTMA generator:

$$y = f * z.$$

f results from the decomposition of the covariance function. The derivative of y with respect to the deformation parameter is:

$$\frac{\partial y}{\partial \rho} = f * \frac{\partial z}{\partial \rho}.$$

Any other geostatistical generator producing Gaussian or related realizations can be used in place of the FFTMA generator, provided that calculation of the gradients is integrated therein. The FFTMA generator however affords the advantage of fast execution, even for realizations discretized on a very large number of grid cells.

Realization y, which is for the moment centered and reduced, that is of average zero and variance one, can then be converted to a Gaussian realization w of average m and variance $\sigma^2$:

$$w(x) = m + \sigma y(x).$$

The derivative with respect to the deformation parameter becomes:

$$\frac{\partial w}{\partial \rho}(x) = \sigma \frac{\partial y}{\partial \rho}(x).$$

At this stage, static data observed at precise points, in wells for example, also have to be taken into account. This information is in general integrated in the realization generated by means of a kriging technique. The constrained realization $w_c$ is deduced from:

$$w_c(x) = w_{dK}(x) + (w(x) - w_K(x))$$

where $w_{dK}$ and $w_K$ are the realizations obtained, for the first one, from kriging of the real observations and, for the second, from kriging of the values of w at the observation points. The kriging estimator, in the dual frame, is expressed as follows:

$$w_K(x) = \sum_{i=1}^{n} p_i C(x - x_i) + m.$$

C is the covariance function. The $x_i$ are the positions of the n observations. The weights $p_i$ are independent of the position, but they depend on the deformation parameters. It can be shown that the derivative of w with respect to the deformation parameter is obtained from:

$$\frac{\partial w_c}{\partial \rho}(x) = \frac{\partial w}{\partial \rho}(x) - \frac{\partial w_K}{\partial \rho}(x)$$

$$\frac{\partial w_K}{\partial \rho}(x) = \sum_{i=1}^{n} \frac{\partial p_i}{\partial \rho} C(x - x_i)$$

$$\sum_{j=1}^{n} \frac{\partial p_j}{\partial \rho} C(x_j - x_i) = \frac{\partial w}{\partial \rho}(x).$$

The permeability field k is deduced from the lognormal transformation of $w_c$:

$$k(x) = \exp(w_c(x)).$$

The permeability gradient with respect to the deformation parameter is expressed as follows:

$$\frac{\partial k}{\partial \rho}(x) = \frac{\partial w_c(x)}{\partial \rho} k(x).$$

Equation 1) allows calculation of the effective permeability of a group of streamlines for a given permeability field. The derivative of the effective permeability with respect to the deformation parameter is deduced therefrom:

$$\frac{\partial K_i^{\textit{eff}}}{\partial \rho} = K_i^{\textit{eff}} \frac{\sum_{k=1}^{N_{gSL}} \sum_{j=1}^{N_k} \frac{q_{k,j} \Delta \tau_{k,j}}{k_j^2} \frac{\partial k_j}{\partial \rho}}{\sum_{k=1}^{N_{gSL}} \sum_{j=1}^{N_k} \frac{q_{k,j} \Delta \tau_{k,j}}{k_j}}$$

These various relations show how to deform a permeability field and to calculate the gradients of the effective permeabilities of the streamlines with respect to a deformation parameter. All these relations can be readily generalized in cases where several deformation parameters are involved. One can notably decide to assign a deformation parameter to each zone defined for calculation of the effective permeabilities.

Several techniques can be considered for minimizing the intermediate function, but since the gradients of the effective permeabilities are available for an insignificant calculation cost, a Gauss-Newton type approach may be judicious. To determine the disturbance to be applied to the deformation parameters so as to reduce the intermediate function, the following system is solved:

$$H\Delta\rho = -\nabla(FI).$$

$\Delta\rho$ is the disturbance to be defined, $\nabla(FI)$ comprises the gradients of the intermediate function with respect to the deformation parameters and H is an approached matrix of the Hessian matrix:

$$H = G^t W G.$$

G is the sensitivity matrix: which includes the derivatives of the effective permeabilities of the streamline groups with respect to the deformation parameters. W is the weight matrix which is here equal to the identity matrix.

Finally, the algorithm developed to minimize the intermediate function is described as follows. Stage 1 allows defining, on the one hand, the desired effective permeabilities for the streamline groups and, on the other hand, zones assigned to these groups.

a) At least one deformation parameter is assigned by zone.

b) An initial Gaussian white noise and at least one complementary Gaussian white noise are defined.

c) A gradual deformation is carried out by combining the previous Gaussian white noises. The derivatives of the Gaussian white noise z resulting from the gradual deformation with respect to the deformation parameters are simultaneously calculated.

d) The Gaussian white noise z is converted to a permeability field k and the derivatives of the permeabilities with respect to the deformation parameters are also determined.

e) The effective permeabilities of the streamline groups defined in stage 1 and their derivatives are calculated.

f) The disturbance to be applied to the deformation parameters to reduce the intermediate function is then estimated.

g) At this stage, several alternatives emerge. If the intermediate function is not weak enough and if it does not appear to have converged, the deformation parameters are updated and return to c) occurs. If the intermediate function is not weak enough but seems to have converged, returns to b) occurs, that is the initial Gaussian white noise is updated and a new complementary Gaussian white noise is randomly selected. Finally, if the objective function is sufficiently weak or if it appears that it is not going to decrease further, stage 2 comes to an end.

The procedure described here focuses on the case of streamline flow simulations. Streamlines actually appear to be a very natural tool for defining zones. From the present invention involving identification of zones and calculation of the effective permeabilities for these zones, this choice seems to be logical. Other types of application can however be considered. For example, the information relative to the various zones could be provided by well tests. The effective permeability can in this case be calculated as a function of the radius of investigation around the well; the zones considered are then rings. The flow simulator used for well test simulation can be a standard flow simulator. The procedure to be followed is similar to the procedure described for the streamlines. Flow simulation allows identification of zones and determination of the effective permeability for these zones, which can be compared with the data measured in the field. Then, minimization of an intermediate objective function according to the approach described above allows propagation of the correction to be applied to the effective permeabilities to the absolute permeabilities of the grid cells in the zones while respecting the a priori spatial variability model. The invention has application notably in the development of oil reservoirs.

The invention claimed is:

1. A method for constructing a reservoir model representative of an underground reservoir, including discretizing said underground reservoir by a set of grid cells, and associating with said reservoir model a permeability field constrained by a priori geologic data and production data or pressure data obtained from well tests collected in said underground reservoir comprising:

a) constructing an initial reservoir model including generating a permeability field in accordance with a stochastic model coherent with the a priori geologic data;
   b) identifying zones inside said underground reservoir;
   c) calculating permeabilities of said zones, using a simulator to simulate fluid flows for estimating simulated production data or simulated pressure data and estimating corrections of said permeabilities for reducing a difference between said production data or pressure data obtained from well tests and said simulated production data or simulated pressure data;
   d) propagating said corrections to said set of grid cells of said reservoir model by an iterative optimization process comprising minimizing a function which depends on said corrections, using a technique of gradual deformation of realizations of said stochastic model; and
   e) using said reservoir model, including said corrections propagated to said set of grid cells, to develop said underground reservoir.

2. The method as claimed in claim 1, comprising using said reservoir model to develop an oil reservoir.

3. The method as claimed in claim 1, wherein flow simulation is carried out by means of a streamline simulator, said zones of said underground reservoir are identified by a set of grid cells traversed by one or more streamlines of fixed geometry and said zones are defined either manually or automatically from said flow simulator.

4. The method as claimed in claim 1, wherein flow simulation is carried out by means of a streamline simulator and said zones of said underground reservoir are identified by a set of grid cells traversed by one or more streamlines of fixed geometry.

5. The method as claimed in claim 1, wherein said zones are identified as volume portions on a periphery of wells running through said reservoir.

6. The method as claimed in claim 2, wherein said zones are identified as volume portions on a periphery of wells running through said reservoir.

7. The method as claimed in claim 3, wherein said zones are identified as volume portions on a periphery of wells running through said reservoir.

8. The method as claimed in claim 4, wherein said zones are identified as volume portions on a periphery of wells running through said reservoir.

9. The method as claimed in claim 1, wherein at least one gradual deformation parameter is assigned to each of said zones.

10. The method as claimed in claim 2, wherein at least one gradual deformation parameter is assigned to each of said zones.

11. The method as claimed in claim 3, wherein at least one gradual deformation parameter is assigned to each of said zones.

12. The method as claimed in claim 4, wherein at least one gradual deformation parameter is assigned to each of said zones.

13. The method as claimed in claim 5, wherein at least one gradual deformation parameter is assigned to each of said zones.

14. The method as claimed in claim 6, wherein at least one gradual deformation parameter is assigned to each of said zones.

15. The method as claimed in claim 7, wherein at least one gradual deformation parameter is assigned to each of said zones.

16. The method as claimed in claim 8, wherein at least one gradual deformation parameter is assigned to each of said zones.

* * * * *